United States Patent Office 3,600,352
Patented Aug. 17, 1971

3,600,352
SILICONE CONSTRUCTION SEALANT
George M. DuJack, Troy, N.Y., assignor to
General Electric Company
No Drawing. Filed June 10, 1968, Ser. No. 735,589
Int. Cl. C08g 47/04
U.S. Cl. 260—37
6 Claims

ABSTRACT OF THE DISCLOSURE

A construction sealant contains a silicone resin and microcrystalline magnesium silicate fibers.

---

This invention relates to a non-curing, plastic, silicone made from a non-curing, plastic, silicone resin construction sealant which retains flow characteristics over the entire usable temperature range, but which does not sag when applied to a vertical joint.

Construction sealants are well known in the art. Adhesive silicone resins having plastic flow properties are also well known in the art and are shown, for example, in Pats. 2,736,721—Dexter, 2,814,601—Currie et al., and 2,857,356—Goodwin, Jr. These silicone resins are unique in that they combine a very high degree of tackiness with thermal stability so that these resins retain their adhesive characteristics over broad temperature ranges. While these resins have the desirable properties listed above, they do not have the flow properties required for most construction sealant applications. For example, in the sealing of a vertical concrete butt joint, the plastic, silicone resins, known before the present invention, would either be so fluid that they would flow down the vertical joint, or if filled with conventional fillers to the point they would not flow down the joint, would be so stiff that they would not flow when the joint expanded, resulting in rupture of the bond between the joint and the resin.

The use of non-silicone construction sealants did not present this type of problem. These sealants are usually applied during building construction during the warm months of the year and have excellent warm weather flow properties. At temperatures below 0° C., however, the non-silicone construction sealants become hard and fail when the butt joints they seal open up. The forces involved are very great because the walls meeting at the joint do not move gradually but tension builds up in a wall until the force is great enough to move the wall and then the wall moves in a sudden jerk.

Silicone rubber is also used to seal butt joints and does not suffer the disadvantage of becoming hard at low temperatures. When a joint expands, however, the rubber stretches setting up tension in the rubber. This tension pulls at the bond the rubber makes with the walls to which it is attached. The result is that the rubber will pull loose from the walls to which it is attached at all points having bonding defects.

The present invention is based on my discovery of a construction sealant composition which does not harden at low temperatures and is not elastic but which retains the advantageous properties of prior art materials.

The compositions of the present invention comprise the siloxane product of intercondensation at a temperature of from about 80° C. to 150° C. of a mixture of ingredients comprising, by weight, (1) 100 parts of a silanol chain-stopped polydiorganosiloxane having a viscosity of at about 50,000 to 2,000,000 centistokes at 25° C., (2) from 50 to 200 parts of a benzene-soluble resinous copolymer of $R_3SiO_{0.5}$ units and $SiO_2$ units in the molar ratio of from 0.4 to 0.67 and preferably 0.5 to 0.6 $R_3SiO_{0.5}$ units per $SiO_2$ unit, and (3) from ½ to 10 parts and preferably from 1 to 3 parts of magnesium silicate crystals having a particle size measured along the major axis of from 1,000 A. to 10,000 A. and a molar ratio of $MgO/SiO_2$ of from 1.0 to 1.4. The particles occur in sheet and tube form. The magnesium silicate crystals preferably are in tube form and have a particle diameter of about 200 A. and a length of about 4,000 A. The compositions can also contain filler, pigment and solvent.

The fact that the presence of the particular magnesium silicate crystals would provide the properties required in a construction sealant is completely unexpected and unpredictable, since the use of finely divided asbestos in an otherwise identical construction sealant does not lead to the improved properties of the construction sealant. Likewise, the substitution in applicant's compositions of other types of thixotropic agents, such as "Thixin" does not result in an improved construction sealant. Other thixotropic agents tried either resulted in the construction sealant flowing down a vertical butt joint at high temperature, or else did not allow the construction sealant to flow vertically upon opening of the butt joint, resulting in adhesion failure with the adjoining walls.

The magnesium silicate crystals employed in the practice of the present invention are synthetic materials prepared by acid treating an asbestos water slurry while subjecting the slurry to ultrasonic vibration. This results in a decrease in the crystal size of the magnesium silicate crystals making up the asbestos, and also a decrease in the $MgO/SiO_2$ ratio to a molar ratio of less than 1.4/1 and preferably a ratio about 1/1 resulting from the solubilizing of some of the magnesium oxide and replacing it with silanol groups. It is believed that it is through the interaction of these silanol groups and the silicone resin that the unique thickening effect takes place. The preferred magnesium silicate crystals are those having a particle thickness of about 200 A. and a particle length of about 4,000 A.

When fillers are added to the composition of the present invention they are usually employed in amounts from about 3 to 200 parts filler per hundred parts of the silicone present. Examples of fillers which may be used include fume silica, precipitated silica, silica aerogel, finely divided asbestos, ground quartz, titanium dioxide, lithopone, zinc oxide, zirconium silicate, iron oxide, calcium carbonate, chopped glass fibers, magnesium oxide, cork, cotton, synthetic fibers, etc.

Pigments are, for all practical purposes, also fillers provided they are solid particulate material and may be used in the same quantities set forth above for fillers. Pigments which may be used include carbon black, graphite, lead oxides, chromium oxides, copper oxides, and in general, any of the metal oxides which are normally used as pigments in paints and plastics.

Solvents which may be used include the conventional hydrocarbon solvents including benzene, toluene, xylene, isoparaffins, etc. The solvent is generally employed in such a quantity so as to constitute from 10 to 20% of the total construction sealant composition. Up to about 50% of the hydrocarbon may be replaced with a trimethylsilyl end-stopped polydiorganosiloxane fluid having a viscosity of preferably less than 50,000 centistokes at 25° C. The function of the solvent is to reduce the viscosity of the construction sealant so that it can be easily applied using a caulking gun, and after application the function of the solvent is to evaporate from the surface of the caulking composition to form a skin which holds the composition in place until the remainder of the volatile component of the solvent evaporates.

The silanol chain-stopped polydiorganosiloxane having a viscosity of 50,000 to 2,000,000 centistokes when measured at 25° C. is well known in the art and generally comprises a polydimethylsiloxane but can also comprise other types of siloxane units and, in many applications, a desirable copolymer is one which contains up to 20 mole percent diphenylsiloxane units, methylphenylsiloxane units, methylvinylsiloxane units, phenylvinylsiloxane units, or the like, with the remaining siloxane units being dimethylsiloxane units. In general, these linear silanol chain-stopped polydiorganosiloxanes have the formula, (1) 

where $n$ is a whole number sufficiently great to provide a silanol chain-stopped polysiloxane having a viscosity of from 50,000 to 2,000,000 centistokes at 25° C. and is generally not greater than 1,000,000, and R is a monovalent hydrocarbon radical. Illustrative of the monovalent hydrocarbon radicals represented by R are lower alkyl radicals having from one to 8 carbon atoms, e.g., methyl, ethyl, butyl, octyl, etc. radicals; mononuclear and binuclear aryl radicals, e.g., phenyl, naphthyl, tolyl, xylyl, etc. radicals; mononuclear aryl lower alkyl radicals, e.g., benzyl, phenylethyl, etc. radicals; lower alkenyl radicals having from 2 to 8 carbon atoms, e.g., vinyl, alkyl, etc. radicals; and cycloaliphatic hydrocarbon radicals, e.g., cyclohexyl, cycloheptyl, cyclohexenyl, etc. radicals. Included within the scope of these monovalent hydrocarbon radicals are also radicals containing various substituents which are inert under the conditions of the reaction. These radicals include, for example, halogenated derivatives of the above described hydrocarbon radicals, such as chloromethyl, beta-chloroethyl, chlorophenyl, dibromophenyl, trifluoromethylethyl, etc. radicals, as well as cyano lower alkyl radicals, such as beta-cyanoethyl, gamma-cyanopropyl, etc. radicals.

The polydiorganosiloxane having silanol chain terminals has been described as having a viscosity of 50,000 to 2,000,000 centistokes at 25° C. These materials are known in the art and are characterized by solubility in hydrocarbon solvents, such as benzene and toluene.

The resinous copolymers of $R_3SiO_{0.5}$ units and $SiO_2$ units employed in the practice of the present invention are also well known in the art and are described, for example, in Pat. 2,736,721—Dexter, in Pat. 2,676,182—Daudt et al., and in Pat. 2,857,356—Goodwin, Jr., all of which are incorporated by reference into the present application for details of the methods of preparing such compositions. A number of such methods are applicable and the present invention is not dependent upon the particular method by which the resinous copolymer is made.

Thus, the resinous copolymer can be made by the process of the Goodwin, Jr. patent, which involves the cohydrolysis of a trialkyl hydrolyzable silane, such as, for example trimethylchlorosilane and an alkyl silicate, such as ethyl orthosilicate, by the addition of the trialkyl hydrolyzable silane and the alkyl silicate to a suitable solvent, such as toluene, benzene, xylene, etc., and thereafter the addition of a sufficient amount of water to effect the desired hydrolysis and co-condensation in a suitable acidic medium. The proportions of the trialkyl hydrolyzable silane and alkyl silicate must result in a resinous copolymer containing from 0.4 to 0.67 $R_3SiO_{0.5}$ unit per $SiO_2$ unit, and preferably from 0.5 to 0.6 $R_3SiO_{0.5}$ unit per $SiO_2$ unit, so that the trialkyl hydrolyzable silane and the alkyl orthosilicate are selected in the same ratio, e.g. 0.4 to 0.67 mole of the trialkyl hydrolyzable silane per mole of the alkyl orthosilicate.

According to the method of the Goodwin, Jr. patent, the two components are dissolved in a suitable solvent, and added with stirring to water, using temperatures of the order of 60 to 85° C. Thereafter, the resulting two-phase system is processed to remove the resulting water-alcohol layer and the resinous material is neutralized with a sufficient amount of sodium bicarbonate or other alkaline material to a pH of at least about 6 or 7. Thereafter, the resinous solution is filtered and advantageously adjusted to a resinous solids content of about 30 to 65 percent, using where necessary, additional amounts of solvents, such as toluene, xylene, etc., in order to avoid premature gelation of the resinous copolymer.

According to the procedure of the Daudt et al. patent, resinous copolymers are prepared by reacting a triorganohalogensilane with sodium silicate.

In both the method of the Goodwin, Jr. patent or the method of the Daudt et al. patent, the organo groups of the triorgano hydrolyzable silane are, of course, selected to be the organo groups within the scope of the organo groups of the polydiorganosiloxane. Preferably, all of the organo groups of the triorgano hydrolyzable silane are methyl groups, but a minor percentage, for example, up to about 20 percent of these groups can be other monovalent hydrocarbon groups, such as ethyl, phenyl, vinyl, or the like. However, it is possible that, in addition to these preferred groups, the organo groups of the triorgano hydrolyzable silane can include the other groups referred to previously. Regardless of whether the Goodwin, Jr. method of preparation is employed or the method of Daudt et al. is employed, the resinous copolymer is generally employed in 35 to 65 percent solids solution, with the solvent being benzene, toluene, xylene, or the like.

In preparing the construction sealant compositions of the present invention, the initial considerations include the need to form a condensation product of the silanol chain terminated polydiorganosiloxane and the resinous copolymer. In addition, it is vital to obtain uniform dispersion of the small magnesium silicate crystals in the composition.

Since this invention involves a product of intercondensation between the polydiorganosiloxane and the resinous copolymer, these two components must be subjected to the conditions which will result in such intercondensation. This intercondensation is relatively simple and merely requires mixing the resinous copolymer and the polydiorganosiloxane and heating the mixture to effect the intercondensation. In general, this intercondensation is effected by heating the reaction mixture at a temperature of from about 80 to 150° C. In particular, since the resinous copolymer is present as a 35 to 60 percent solid solution, it is desirable to use this solution as the basis from which to form the construction sealant composition. This generally involves the addition of more solvent, which advantageously is an aromatic hydrocarbon solvent, such as benzene, toluene, or xylene, and then the polydiorganosiloxane is added to the resulting solution and the entire reaction mixture is cooked or heated at the reflux temperature of the reaction mixture for several hours to insure that intercondensation has been effected. After this heating step, the reaction mixture is stripped of sufficient solvent to increase the solids content to about 60 to 90 weight percent solids, which is the concentration at which applicant's composition is usually employed in construction sealant applications.

The amount of extra solvent added to the reaction mixture can vary within very wide limits, since the function of the solvent is to facilitate the handling of the reaction mixture. Therefore, it is desirable to have enough solvent to readily dissolve the silanol stopped polydiorganosiloxane but, being aware that a large portion of the added solvent must be subsequently stripped, it is desirable not to employ too much solvent. A convenient range of solvent is from about 100 to 200 parts by weight solvent per 100 parts of silanol stopped polydiorganosiloxane.

After the intercondensation has been effected the magnesium silicate crystals, filler and pigment are added and mixed in by conventional mixing methods.

The following examples are illustrative of the practice of my invention and are not intended for purposes of lamination. All parts are by weight.

The microcrystalline magnesium silicate used in the examples were Avibest-C and Avibest-C-HD which are commercially available from the FMC Corporation. Avibest-C was prepared by subjecting an acid water slurry of chrysotile asbestos made up of rod like fibers to ultrasonic vibration until the MgO content of the fibers constituting the asbestos dropped to 37 weight percent of the total fiber weight and the particle size of the asbestos fibers was reduced to a diameter of 200 A. and a length of 4,000 A.

Avibest-C-HD was prepared by a similar method but chrysotile asbestos containing a large percentage of asbestos flake as opposed to asbestos fiber was used in its manufacture.

EXAMPLE 1

A mixture was prepared of 70 parts of a 53% solids solution in xylene of a resinous copolymer of trimethylsiloxane units and $SiO_2$ units containing 0.55 trimethylsiloxane unit per $SiO_2$ unit and 80 parts of a silanol chain-stopped copolymer of dimethylsiloxane units having a viscosity of about 800,000 centistokes at 25° C.

The mixture was heated to 100° C. under pressure and with agitation until the mixture had a viscosity of 124,000 centistokes. To the mixture was then added with thorough mixing 124 parts of finely ground quartz having an average particles diameter of 5 microns, 2.3 parts of Avibest-C, 5.8 parts of a silanol end-stopped polydimethylsiloxane containing 800 dimethylsiloxy units, 0.04 part of finely divided CuO, 0.04 part of $Cr_2O_3$, 0.2 part of $Fe_3O_4$, 4.4 parts of $TiO_2$ and 0.5 part of $Fe_2O_3$. The mixing resulted in a homogeneous construction sealant composition. The construction sealant composition was packaged in standard caulking cartridges.

The construction sealant composition was used to seal butt joints of buildings constructed of precast concrete slabs. When used to seal butt joints of hot concrete slabs exposed to the summer sun, there was no noticebable sag in the construction sealant after application. When used in conjunction with slabs which had been cast in an oil coated mold, it was found the construction sealant adhered well though the slab surface was spotted with oil. The construction sealant also adhered well to slabs which were damp during application, and to slabs which were thoroughly wetted after application of the caulking composition. It was also found that paint would adhere well to butt joints which had been caulked with this composition. Subsequent expansion and contraction of the butt joints caulked with the construction sealant of this example failed to either rupture the bond between the concrete and the construction sealant or to tear the construction sealant.

EXAMPLE 2

Example 1 was repeated except that Avibest-C-HD was substituted for the Avibest-C. The construction sealant composition produced had the same properties and achieved the same result as those produced by the use of Avibest-C.

EXAMPLE 3

A mixture was prepared of 70 parts of a 53% solids solution in xylene of a resinous copolymer of trimethylsiloxane units and $SiO_2$ units containing 0.45 trimethylsiloxane unit per $SiO_2$ unit and 80 parts of a silanol chain-stopped copolymer of dimethylsiloxane units having a viscosity of about 300,000 centistokes at 25° C. The mixture was heated to 100° C. under pressure and with agitation until the mixture had a viscosity of 130,000 centistokes. To the mixture was then added with thorough mixing 70 parts of finely ground quartz having an average particle diameter of 5 microns, 1.5 parts of Avibest-C, 5.8 parts of a silanol end-stopped polydimethylsiloxane containing 800 dimethylsiloxy units, 0.04 part of finely divided CuO, 0.04 part of $Cr_2O_3$, 0.2 part of $Fe_3O_4$, 4.4 parts of $TiO_2$, and 0.5 part of $Fe_2O_3$. After the mixing resulted in a homogeneous construction sealant composition, the construction sealant was packaged in standard caulking cartidges.

The construction sealant was used to seal butt joints of buildings constructed of precast concrete slabs. The results were much the same as Example 1. The construction sealant of the present example, however, was more fluid and easier to apply.

What I claim as new and desire to secure by Letters Patent of the United States is:

1. A plastic, permanently fluid, silicone construction sealant composition consisting essentially of
   (A) an adhesive silicone resin produced by the intercondensation of a mixture of ingredients comprising, by weight,
       (1) 100 parts of a silanol chain-stopped polydiorganosiloxane having a viscosity of 50,000 to 2,000,00 centipoises at 25° C.,
       (2) from about 5 to 200 parts of a benzene-soluble resinous copolymer of $R_3SiO_{0.5}$ units and $SiO_2$ units in the molar ratio of from about 0.4 to 0.67 $R_3SiO_{0.5}$ unit per $SiO_2$ unit, and
   (B) from about ½ to 10 parts of magnesium silicate crystals derived from asbestos, said crystals having a molar ratio of $MgO/SiO_2$ of from 1.0 to 1.4 and having a particle size measured along the major axis of from 1,000 A. to 10,000 A.; and the organo groups of said adhesive silicone resin are selected from the group consisting of lower alkyl radicals, mononuclear and binuclear aryl radicals, mononuclear aryl lower alkyl radicals, lower alkenyl radicals, halogenated derivatives of the above radicals and cyano lower alkyl radicals.

2. The composition of claim 1 in which said polydiorganosiloxane is a polydimethylsiloxane.

3. The composition of claim 1 in which R is methyl.

4. The composition of claim 1 in which the polydiorganopolysiloxane is a polydimethylsiloxane and in which R is methyl.

5. The composition of claim 1 in which the organo groups of said polydiorganosiloxane group are selected from the class consisting of methyl, vinyl, phenyl, and mixtures thereof, and in which R is methyl.

6. The composition of claim 4 in which the magnesium silicate crystals have a particle diameter of about 200 A. and a particle length of about 4000 A.

References Cited

UNITED STATES PATENTS

| 2,626,213 | 1/1953 | Novak | 92—3 |
| 3,457,214 | 7/1969 | Modic | 260—37Si |

FOREIGN PATENTS

| 666,992 | 7/1963 | Canada | 23—110 |

OTHER REFERENCES

American Chemical Society, "Avibest Crystals Increase Viscosities," Chemical and Engineering News, vol. 44, No. 41, Oct. 3, 1966, pp. 57–8.

MORRIS LIEBMAN, Primary Examiner

S. M. PERSON, Assistant Examiner

U.S. Cl. X.R.

106—288